(12) United States Patent
Sonnenfeld et al.

(10) Patent No.: US 11,625,663 B2
(45) Date of Patent: Apr. 11, 2023

(54) SYSTEMS AND METHODS OF ASSESSING WEB ACCESSIBILITY OF COMPUTING SYSTEMS

(71) Applicant: salesforce.com, inc., San Francisco, CA (US)

(72) Inventors: Daniel Sonnenfeld, San Francisco, CA (US); Adam Rodenbeck, San Diego, CA (US); Jesse Hausler, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/319,148

(22) Filed: May 13, 2021

(65) Prior Publication Data

US 2022/0366347 A1    Nov. 17, 2022

(51) Int. Cl.
*G06Q 10/00* (2012.01)
*G06Q 10/0639* (2023.01)
*G06Q 10/10* (2023.01)

(52) U.S. Cl.
CPC ....... *G06Q 10/06395* (2013.01); *G06Q 10/10* (2013.01)

(58) Field of Classification Search
CPC .. G06Q 10/10; G06Q 10/063; G06Q 10/0639; G06Q 10/06395
See application file for complete search history.

(56) References Cited

U.S. PATENT DOCUMENTS

| | | | |
|---|---|---|---|
| 10,031,730 B2 | 7/2018 | Davidchuk | |
| 10,198,484 B2 | 2/2019 | Hausler | |
| 10,430,765 B2 | 10/2019 | Hausler | |
| 10,572,031 B2 | 2/2020 | Hausler | |
| 10,579,222 B2 | 3/2020 | Hausler | |
| 10,642,474 B2 | 5/2020 | Hausler | |
| 10,896,192 B2 | 1/2021 | Schoppe | |
| 10,977,013 B2 | 4/2021 | Davidchuk | |
| 11,055,208 B1* | 7/2021 | Pandurangarao | G06F 16/958 |

(Continued)

OTHER PUBLICATIONS

Kous, K., Kuhar, S., Pusnik, M., & Sumak, B. (2019). Comparative analysis of faculties' websites accessibility based on an automatic evaluation. (Year: 2019).*

*Primary Examiner* — William S Brockington, III
(74) *Attorney, Agent, or Firm* — Butzel Long

(57) ABSTRACT

Systems and methods are provided for receiving, at a server, one or more success criteria for content accessibility. The server may receive a product, such as a web-based application or a website, to be evaluated based on the success criteria. The server may determine one or more accessibility exceptions of the product based on one or more inputs and the one or more success criteria. The server may determine relationships between the one or more accessibility exceptions of the product and the one or more success criteria using custom objects and schema from a database communicatively connected to the server. The server may determine product quality of the received product using the determined relationships and the one or more accessibility exceptions. The server may generate a dynamic accessibility conformance report based on the determined product quality, and may transmit the dynamic accessibility conformance report for display.

20 Claims, 6 Drawing Sheets

(56) References Cited

U.S. PATENT DOCUMENTS

| | | | |
|---|---|---|---|
| 2006/0277250 A1* | 12/2006 | Cherry | H04L 43/0811 |
| | | | 709/203 |
| 2012/0254826 A1* | 10/2012 | Ganesh | G06F 11/3672 |
| | | | 717/101 |
| 2014/0351796 A1* | 11/2014 | Gur-esh | G06F 11/3604 |
| | | | 717/126 |
| 2016/0283365 A1* | 9/2016 | Brealey | G06F 11/3692 |
| 2018/0307466 A1 | 10/2018 | Davidchuk | |
| 2019/0073365 A1* | 3/2019 | Jamshidi | G06F 16/986 |
| 2019/0129589 A1 | 5/2019 | Ryan | |
| 2021/0081165 A1* | 3/2021 | Deshmukh | G06N 20/00 |

* cited by examiner

200

Exceptions
- AQUA — *Master-Detail( AQUA Accessibility Conforma*
- AQUA Exception Number — *Auto Number*
- AQUA WCAG Success Criteria — *Lookup/AQUA WCAG Success Criteria*
- Created By — *Lookup(User)*
- Currency — *Picklist*
- Last Modified By — *Lookup (User)*
- Status — *Picklist*
- Work — *Lookup(work)*
- Work Status — *Formula (Text)*

220 — Success Criteria
- Active — Checkbox
- Conformance Level — *Picklist*
- Created By — *Lookup(User)*
- Currency — *Picklist*
- Last Modified By — *Lookup(User)*
- Owner — *Lookup(User+1)*
- Success Criteria Name — *Text(80)*
- Success Criteria Number — *Text(100)*
- Summary — *Rich Text Area(32768)*
- URL to WCAG guideline — *URL(256)*
- WCAG Version — *Picklist*

210

230 — Accessibility Conformance Report
- Accessibility Contact — *Lookup(User)*
- ACR name — *Text(80)*
- Created By — *Lookup(User)*
- Currency — *Picklist*
- Last Modified By — *Lookup(User)*
- Owner — *Lookup(User+1)*
- Product Contact — *Lookup(User)*
- Published Externally — Checkbox
- Release Assessed — *Lookup (Release)*

240 — Work Items
- Absolute Age — *Formula (Number)*
- Access Location — *Picklist (Multi-Select)*
- Additional Details — *Long Text Area (1000)*
- Add Parent ID — *Text(255)*
- Age — *Formula (Number)*
- Age_In_Hours — *Formula (Number)*
- Age Since Last Modified — *Formula (Number)*
- Age with Scrum Team — *Formula (Number)*
- Age with Scrum Team When Closed — *Formula (Number)*
- All Autobuilds — *Long Text Area (2000)*
- All Test Failure Count — *Number(6,0)*
- Apex Hammer Compile Failure — Checkbox
- Apex Hammer Gack Affected Orgs — *Text(255)*
- Assigned On — *Date*
- Assigned To — *Lookup(User)*
- Associated URL — *URL(255)*
- Attributes — *Picklist (Multi-Select)*
- Auto Build — *Long Text Area (1000)*
- Backburner Rank — *Number(18,0)*

Show More fields

| | Accessibility Conformance Report with Exceptions and Work | | |
|---|---|---|---|
| Total Records 68 — 302 | — 304 | — 320 | — 330 |
| ☐ AQUA WCAG Success Criteria | Work: Subject | | Work: Work ID |
| ☐ 1.1.1 Non-text Content (3)<br><br>306 | [Accessibility] In High Contrast theme has been activated in the Windows OS, some UI elements such as images, HTML Form Controls, and Borders are no Longer Visible | | W-8784780<br>— 332 |
| | [Accessibility] The columns report colors and "Joined Report" indicator icon images does not contain any alternative information or meaningful representation | 322 | W-8784761 |
| | [Accessibility] The "Edit" and "Delete" icon images does not contain any alternative information or meaningful representation | | W-8784746 |
| ☐ 1.3.1 Info and Relationships (9)<br><br>308 | [Accessibility] The tooltip value available on the "Information" icon image is not announced properly by the screen readers | | W-8784777 |
| | [Accessibility] The "Action" column table header cell is left blank | | W-8784769 |
| | [Accessibility] The HTML scope="col" attribute is missing from the dashboard table widget headers        334 | | W-8784768 |
| | [Accessibility] The "Last" Column table header cell is left blank | 324 | W-8784748 |
| | [Accessibility] The tooltip value available on the "Information" icon image is not announced properly by the screen readers | | W-8784747 |
| | [Accessibility] The tooltip value available on the "Information" icon image is not announced properly by the screen readers | | W-8784734 |
| | [Accessibility] The "First" column table header cell is left blank, and no information is provided for the assistive technology users | | W-8784717 |
| | [Accessibility] The data table with more than one row/ column of headers does not use id and headers attributes to identify cells | | W-8784716 |
| | [Accessibility] The "Reports Summary" view data table does not use a scope attribute to identify cells | | W-8784715 |
| ☐ 1.4.1 Use of Color (10)<br><br>310 | [Accessibility] The selected report is not announced as selected or checked as visually displayed | | W-8784772 |
| | [Accessibility] The selected left menu item is not announced as selected by the screen reader as selected | | W-8784771 |
| | [Accessibility] The selected left menu item displayed in the "Reports" list view page is not announced as selected by the screen reader | 326 | W-8784764 |
| | [Accessibility] The selected tab indication for the color selector is not announced as current or selected | | W-8784755 |
| | [Accessibility] The selected tab indication for the color selector is not announced as current or selected | | W-8784749 |

SYSTEMS AND METHODS OF ASSESSING WEB ACCESSIBILITY OF COMPUTING SYSTEMS

BACKGROUND

Presently, accessibility conformance reports are generated manually using a third-party accessibility audit, which shows the status of a product such as a web site, a web application, or web tools at the time of an audit. The issues found during audits are separately entered into a tracking system as bugs, which is done manually. When the bugs are fixed in the product, the only way to show the update and re-determine accessibility of the product is to perform another manual audit.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIG. 4 shows example input components for generating the dynamic accessibility conformance report according to an implementation of the disclosed subject matter.

FIG. 5 shows an example dynamic accessibility conformance report that is generated according to implementations of the disclosed subject matter.

DETAILED DESCRIPTION

Figure 1:
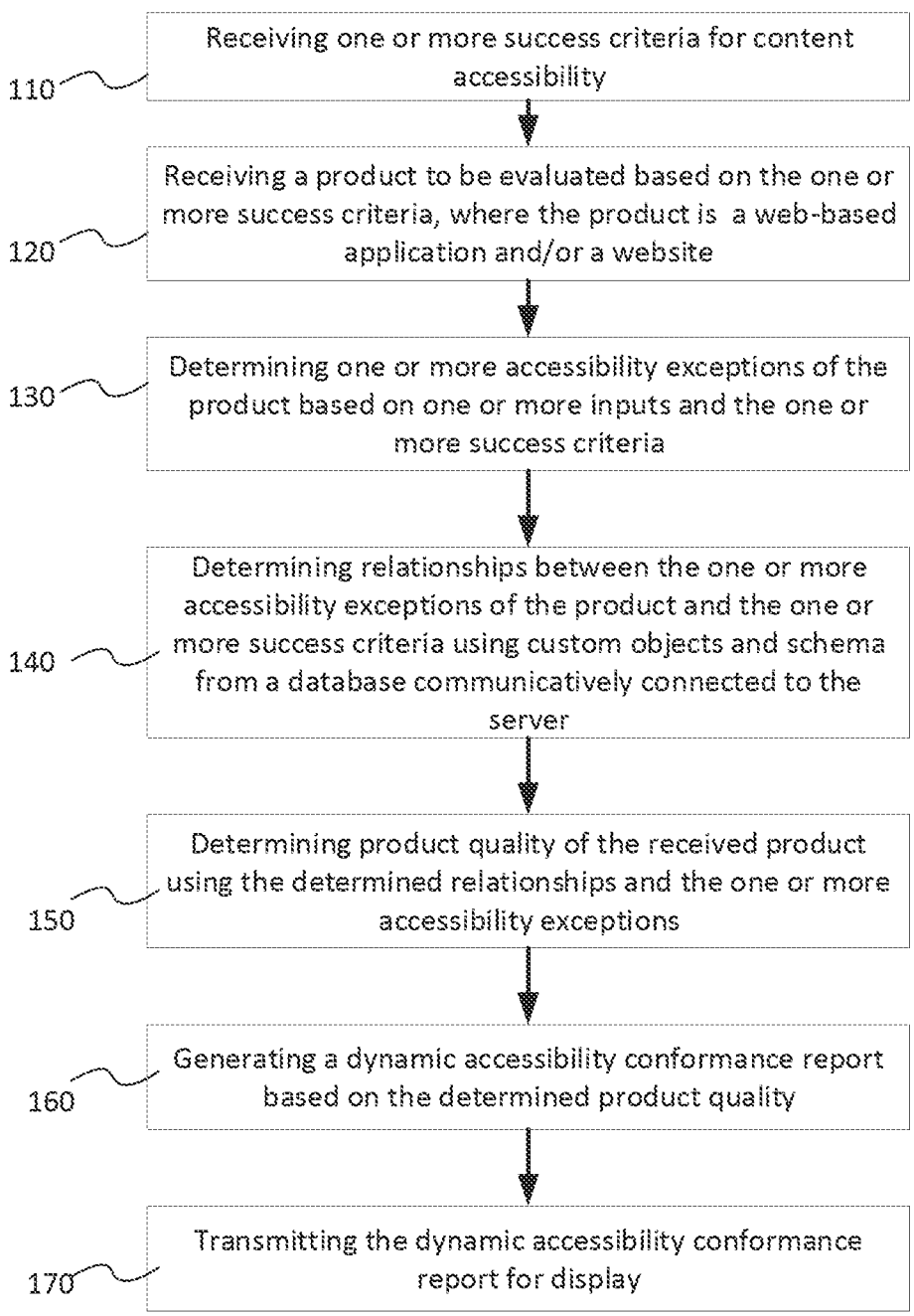
FIGS. 1-3 show example methods of generating dynamic accessibility conformance reports according to implementations of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide custom objects and schema that may track product quality using success criteria for accessibility of one or more users to a computing system. The product may be a web-based application, a web site, web tools, or the like. Inputs for the systems and methods of the disclosed subject matter may include uploads from audits, logged bugs, pre-release manual testing and/or automated testing, customer compliance requests, and the like. Implementations of the disclosed subject matter may generate a dynamic accessibility conformance report as output, based on the inputs. The disclosed subject matter may identify whether testing has been performed for each of the success criteria and may identify the source of the testing. The dynamically generated accessibility conformance report may be used to improve access and/or usability of the web-based application, web site, and/or web tools of computing systems for users with disabilities.

Implementations of the disclosed subject matter provide a real-time status on product quality (e.g., a report), which may be used to determine development of the product and/or computing systems to improve accessibility and/or usability for users with disabilities. The report may include the success criteria, the work items, the subject of the work item, and a work identifying number. The report may provide a real-time status on product quality and accessibility, and may be provided to users and/or customers. The real-time status of the accessibility of the product may be used to improve accessibility of users with disabilities to the web-based application, web site, and/or web tools of computing systems.

Current accessibility conformance reports for a product, such as Accessibility Conformance Reports (ACRs), are generated manually. This reflects the accessibility status of a product only at the time of an audit, which is performed periodically. Such audits are typically performed using a combination of manual and automated testing. The issues found during audits are manually entered into a tracking system as bugs. When the bugs are fixed, the only way to show the update with the ACR is to perform another audit. That is, current systems are unable to provide real-time quality status for a product. Any decisions to be made for updating a product are based on an ACR that is outdated when any bug fixes are made. That is, there is no dynamic way to determine the accessibility of a product and improve the accessibility of computing systems with the product for users with disabilities.

In implementations of the disclosed subject matter, custom objects and schema stored in a database coupled to a server may be used to track product quality using success criteria for accessibility, and may provide real-time assessments as to whether the product (e.g., web application, web site, web tools, or the like) has accessibility exceptions that to be resolved. The real-time assessment may include an accessibility conformance report that details which category of success criteria an exception has been found for, and what needs to be changed in the product to comply with accessibility success. This provides for more frequent assessment of accessibility characteristics of the product, and may provide developers with information on what needs to be changed with the product, as well as providing information to customers as to how accessible the product is (e.g., compared to other products which accessibility scores may also be available for). Unlike current systems, implementations of the disclosed subject matter form relationships between exceptions and success criteria, and the dynamically generated accessibility conformance reports detail the relationships between the exceptions to the success criteria, along with work items to be performed so that the product and computing systems may meet the success criteria of accessibility for users with disabilities.

Accessibility of a product, such as a web site, web application, and/or web tool is important so that users with disabilities may be able to use such products. Currently, many sites and tools are developed with accessibility barriers that make them difficult or impossible for some people to use. Making web sites, web application, and/or web tools accessible to all may benefit users, businesses, organizations, and society. That is, web sites, web tools, and/or web applications should be usable by people with disabilities, and not exclude people from using products and services provided by the web site, web tools, and/or web applications.

Accessible products may allow users to perceive, understand, navigate, and/or interact with the product. Users with auditory, cognitive, neurological, physical, speech, and/or visual disabilities may be able to use accessible products. Accessible products may benefit users using devices with smaller screens (e.g., smart phones, tablets, wearable computing devices, and the like), users with changing abilities (e.g., due to aging), users with temporary ability impairment (e.g., arm in a sling or cast, lost glasses, or the like), users with situational limitations (e.g., audio difficult to hear given background noise from environment, display may be difficult to see based on bright sunlight), and/or users with a limited communications network connection which may limit the amount of data that may be received.

Web sites, web applications, and/or web tools executed by computing systems may be important for users in education, business, government, charity organizations, commerce, health care, entertainment, or the like. It is desirable to have products and computing systems be accessible to users with diverse disabilities. Implementations of the disclosed subject matter may be used to dynamically identify accessibility issues with a web site, web application, and/or web tool of a computing system, and may generate an accessibility conformance report to show the relationship between exceptions to the success criteria for determining accessibility for users of disabilities for computing systems.

Implementations of the disclosed subject matter may allow product managers and/or users to determine the accessibility of a web site, web application, and/or web tools based on a dynamically generated accessibility conformance report. Accessibility conformance reports may be used to increase accessibility of products and computing systems, and may be used to determine trends in accessibility issues over differing products and computing systems for users with disabilities.

Figure 2:
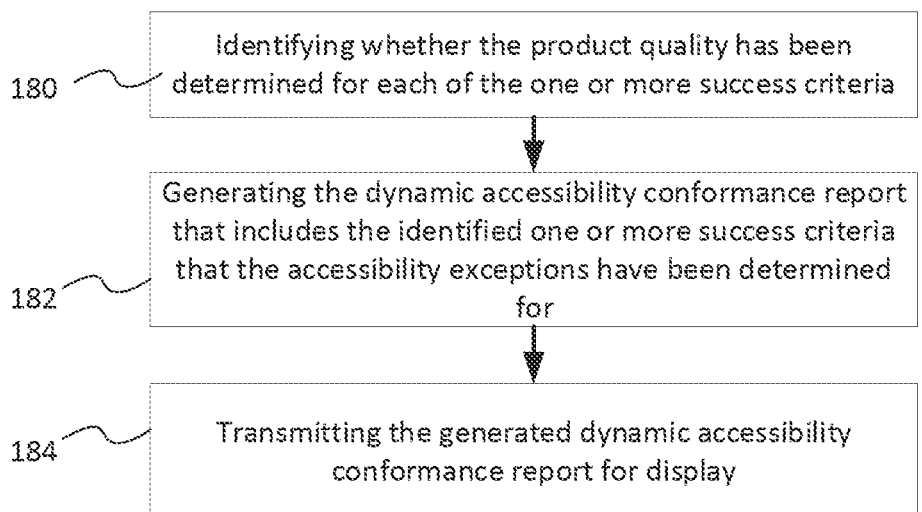
Figure 3:
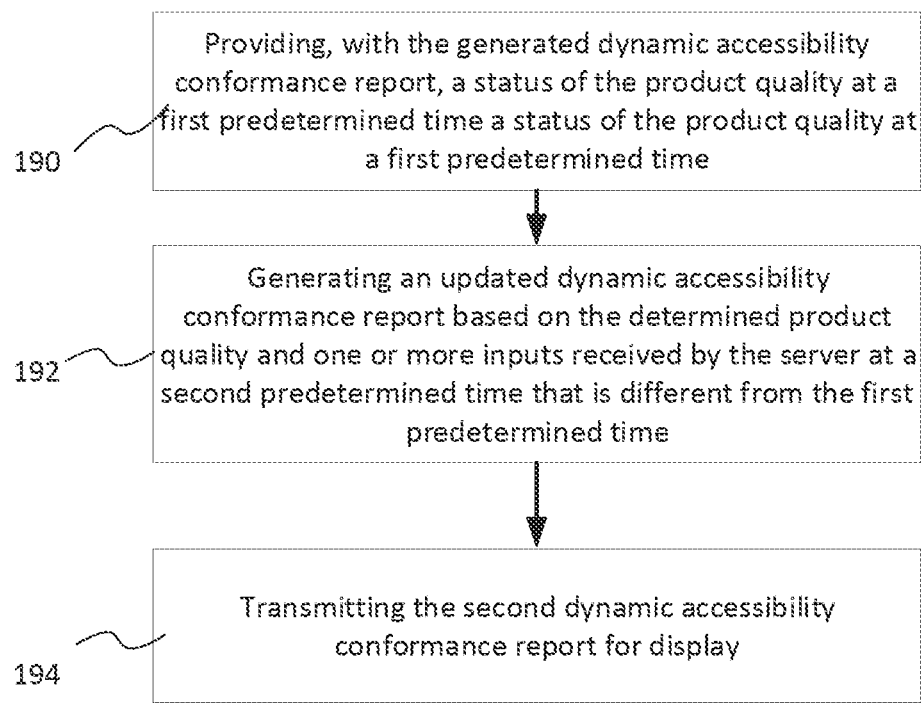

FIGS. 1-3 show an example method 100 of generating dynamic accessibility conformance reports according to implementations of the disclosed subject matter. At operation 110, a server may receive one or more success criteria for content accessibility. The server may be server 700 shown in FIG. 6, and may receive the success criteria from storage 710, database 800, and/or computer 500 shown in FIG. 6 and described below. The success criteria may be, for example, text alternatives, time-based media, adaptability, distinguishable presentation, keyboard accessibility, navigability, input modalities, readability, predictability of operation, input assistance, compatibility, or the like. In some embodiments, the Web Content Accessibility Guidelines (WCAG) may be used.

The WCAG Guidelines may have sub-categories, called success criteria. For example, the text alternatives guideline may include non-text content success criteria. In another example, the time-based media may include audio-only content, video-only content, audio description, media alternative, captions, sign language, or the like. In yet another example, adaptability may include information and relationships, meaningful sequence, sensory characteristics, input purpose, and the like. In another example, the distinguishable presentation sub-categories may include use of color, audio control, contrast, resizing of text, images of text, low or no background audio, non-text contrast, text spacing, content on hover or focus, or the like. The guideline may include readable, which may include success criteria for language used, unusual words, abbreviations, reading level, and the like. The input assistance guideline may include success criteria for error identification, labels or instructions, error suggestion, and/or error prevention.

At operation 120, the server may receive a product to be evaluated based on the one or more success criteria. For example, the product may be a web-based application, a web site, web tools, or the like. For example, the server 700 shown in FIG. 6 may receive the product to be evaluated from the database 800, the server 900, and/or the computer 500. In some implementations, the server 700 may evaluate the product that is stored in the database 800, stored in storage 910 of the server 900, and/or that is stored in the fixed storage 530 and/or removable media 550 of computer 500.

At operation 130, the server may determine one or more accessibility exceptions of the product based on one or more inputs and the one or more success criteria. For example, accessibility exceptions may be instances where one or more attributes of the product is incongruent with and/or may not meet the success criteria. In some implementations, the one or more inputs may be audits, logged bugs, pre-release manual testing, automated testing, customer compliance requests, customer input, and the like which may be provided to the server 700 from database 800 and/or the server 900 shown in FIG. 6. The audit inputs may be a previous audit for the product. The logged bugs may be accessibility issues that have been previously determined for the product (e.g., since the product has been released, since the last audit for the product, or the like). The pre-release manual testing may be data from testing the product before the release of the product to the public and/or before accessibility testing of the product using the success criteria. Automated testing may be any accessibility testing of the product that is not performed manually. Customer compliance requests and/or customer input may be accessibility issues of the product that are reported by customers who are using the product. These inputs, along with the success criteria, may be used by the server to determine whether the product meets the success criteria, or whether there are accessibility exceptions to be reported to direct accessibility development and refinement of the product.

That is, in operation 130, the server may determine whether or not the one or more success criteria for accessibility applies to the product, whether one or more aspects, attributes, functionality, or the like of the product violates the one or more success criteria (e.g., whether an exception is created), or the like. Implementations of the disclosed subject matter may synchronize the determined exceptions with any exceptions that may appear in an accessibility conformance report. This may improve the accuracy of the report, and may be used in developing the product and/or computing systems to improve accessibility for users with disabilities.

At operation 140, the server may determine relationships between the one or more accessibility exceptions of the product and the one or more success criteria using custom objects and schema from a database communicatively connected to the server. The objects and schema may include an accessibility conformance report, one or more exceptions, work items, and the like as shown in FIG. 4 and discussed below. The custom objects and schema may be stored, for example, in database 800 shown in FIG. 6. The objects and schema may be used to identify relationships between exceptions and success criteria, which may be used in generating a dynamic accessibility conformance report and improving accessibility of computing systems.

At operation 150, the server may determine product quality for accessibility of the received product using the determined relationships and the one or more accessibility exceptions. The server may determine one or more tables for the relationship between exceptions and the success criteria. For example, a total number of accessibility exceptions for the success criteria for the product may be used to determine product quality for accessibility. In some implementations, the number of accessibility exceptions for each success criteria may be determined, and a total number of exceptions may be determined by adding the number of exceptions for each exception together.

At operation 160, the server may generate a dynamic accessibility conformance report based on the determined product quality, and may transmit the dynamic accessibility conformance report for display at operation 170. For example, the server 700 shown in FIG. 8 may transmit the dynamic accessibility conformance report to the computer 500 for display on display 520. The dynamic accessibility conformance report may include the one or more success criteria, one or more work items, a subject of the one or more work items, a work identifying number, or the like. The one or more work items may produce items to be addressed (e.g., by a developer, a user, or the like) based on the one or more success criteria and the one or more accessibility exceptions to improve accessibility of the product and computing systems for users with disabilities.

FIG. 4 shows example objects 200 for generating the dynamic accessibility conformance report according to an implementation of the disclosed subject matter. The exceptions 210 may be violations of the success criteria 220 and/or product bugs from third party sources, such as from server 900 and/or database 800 shown in FIG. 6. Exceptions 210 may be used to generate the accessibility conformance report 230 using inputs from the success criteria 220 and work items 240. The success criteria may be related to non-text content, text content, time-based media, adaptability, distinguishable presentation, keyboard accessibility, navigability, input modalities, readability, predictability of operation, input assistance, compatibility, or the like, as discussed above. The accessibility conformance report 230 may be a previous report for the product which may be used to determine exceptions based on the success criteria. The work items 240 may include items to be fixed (e.g., by developers or the like) based on the success criteria 220 and the exceptions 210. The objects 200 may be used by the server to generate a dynamic accessibility conformance report for the product.

FIG. 5 shows an example dynamic accessibility conformance report 300 that is generated according to implementations of the disclosed subject matter. The accessibility conformance report may detail the accessibility of a product based on the success criteria and/or one or more defined accessibility standards. The dynamic accessibility conformance report 300 may include total records 302, which may include the total number of exceptions and work items for accessibility based on the success criteria. The exceptions and work may be ordered based on success criteria 304, which may be a column that may include items for each success criteria that may have an exception and/or work. For example, as shown in FIG. 5, the success criteria having exceptions and/or work may include non-text content 306, information and relationships 308, and use of color 310. Each success criteria may indicate the number of exceptions for the success criteria. The work subject 320 may be a column in the dynamic accessibility conformance report 300 for each work subject for a corresponding success criteria.

For example, the non-text content 306 success criteria may have one or more work subject items 322, the information and relationships 308 success criteria may have one or more work subject items 324, and the use of color 310 success criteria may have one or more work subject items 326. Each work subject (e.g., work subject 322, 324, 326) may include a description of the success criteria exception to be addressed to comply with a particular success criteria. That is, the subject of the one or more work items may include a description based on the one or more success criteria and the one or more accessibility exceptions. Developers and/or other users may use the work subject to determine how to modify the product and/or computing systems to comply with the success criteria for accessibility, and improve access for users with disabilities. Work ID 330 may be a column in the dynamic accessibility conformance report 300 that may include a work ID (identifier) for each work subject (e.g., work subject 322, 324, 326). The work ID may be an identifier for each work subject, and may be used by the server to track an exception, determine whether the exception has been addressed when an update to the product has been made.

In the example accessibility conformance report 300, the non-text content 306 success criteria may have three exceptions, which may include three work subjects associated with each of these exceptions. The information and relationships 308 success criteria may have nine exceptions, and work subjects for each of these exceptions. The use of color 310 success criteria may have ten exceptions (with only five exceptions shown), and work subjects for each of those exceptions.

As described above in connection with FIG. 4, exceptions such as those in an accessibility conformance report shown in FIG. 5 and/or provided by a third-party source, such as server 900 and/or database 800, may be used by the server 700 as inputs to generate exceptions and/or an accessibility conformance report based on the success criteria. In some implementations, when there is an absence of bugs and/or exceptions in an accessibility conformance report, one or more additional operations may be performed at the server and/or by a user to determine whether there are other accessibility issues with the product that are not captured by the success criteria.

In some implementations, method 100 may include additional operations, as shown in FIG. 2. At operation 180, the server may identify whether the product quality has been determined for each of the one or more success criteria at operation 180. At operation 182, the server may generate the dynamic accessibility conformance report that includes the identified one or more success criteria that the accessibility exceptions have been determined for. This may be shown in FIG. 5, where the non-text content 306 success criteria may have three exceptions, the information and relationships 308 success criteria may have nine exceptions, and the use of color 310 success criteria may have ten exceptions. At operation 184, the server may transmit the generated dynamic accessibility conformance report for display. For example, the server 700 may transmit the accessibility conformance report 300 shown in FIG. 5 to the computer 500 shown in FIG. 6 for display on display 520.

FIG. 3 shows additional operations for method 100. At operation 190, the generated dynamic accessibility conformance report may provide a status of the product quality at a first predetermined time. For example, the product quality may include the total records 302 for exceptions and work shown in FIG. 5 and described above. The first predetermined time may be, for example, the first time that an accessibility conformance report is generated for a particular product and/or version of a product. At operation 192, the server may generate an updated dynamic accessibility conformance report based on the determined product quality and one or more inputs received by the server at a second predetermined time that is different from the first predetermined time. For example, one or more developers and/or users may change the product based on the generated dynamic accessibility conformance report generated at the first predetermined time. That is, one or more of the exceptions from the accessibility conformance report generated at the first predetermined time may be addressed in the revised product, and a new accessibility conformance report may be generated at the second predetermined time to re-determine the product quality. For example, the accessibility conformance report for the updated product generated at the second predetermined time may have fewer total records that the accessibility conformance report generated at the first predetermined time for the original product. That is, one or more exceptions from the accessibility conformance report at the first predetermined time may not be present in the accessibility conformance report generated at the second predetermined time, and the product may have been adjusted to address the one or more exceptions. At operation 194, the server may transmit the second dynamic accessibility conformance report for display. For example, the server may transmit the second dynamic accessibility conformance report to the computer 500 shown in FIG. 6 for display on the display 520.

In some implementations, the product may be separately validated by the server and/or one or more users for accessibility. For example, a product evaluated using the success criteria for an accessibility conformance report may include accessibility issues that may not be captured by the success criteria. The product may be separately evaluated to determine whether one or more accessibility features are supported.

Figure 6:
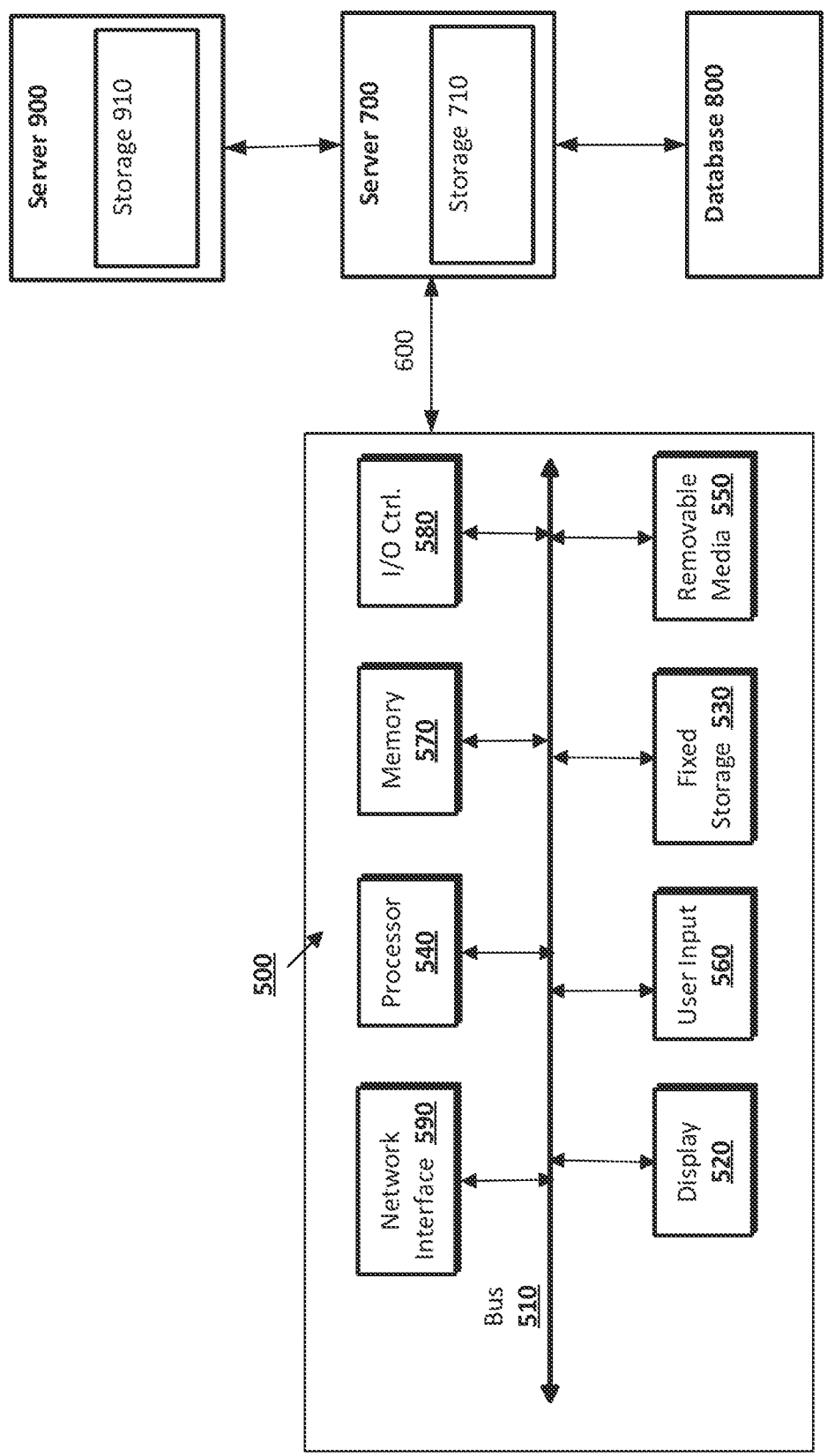
FIG. 6 shows an example system according to an implementation of the disclosed subject matter.

Implementations of the presently disclosed subject matter may be implemented in and used with a variety of component and network architectures. FIG. 6 is an example computer 500 which may generate a dynamic accessibility conformance report based on the example methods shown in FIGS. 1-3 and described above.

As shown in FIG. 6, the computer 500 may communicate with a server 700 (e.g., a server, cloud server, database, cluster, application server, neural network system, or the like) via a wired and/or wireless communications network 600. Although one server 700 is shown in FIG. 8, the server 700 may be a plurality of servers, cloud servers, databases, clusters, application servers, neural network systems, or the like. The server 700 may include a storage device 710. The storage 710 may use any suitable combination of any suitable volatile and non-volatile physical storage mediums, including, for example, hard disk drives, solid state drives, optical media, flash memory, tape drives, registers, and random access memory, or the like, or any combination thereof. The server 700 may be communicatively coupled to database 800, which may use any suitable combination of any suitable volatile and non-volatile physical storage mediums, including, for example, hard disk drives, solid state drives, optical media, flash memory, tape drives, registers, and random access memory, or the like, or any combination thereof. The server 700 may be communicatively coupled to server 900, which may be one or more servers, cloud servers, databases, clusters, application servers, neural network systems, or the like. Server 900 may include storage 910, which may use any suitable combination of any suitable volatile and non-volatile physical storage mediums, including, for example, hard disk drives, solid state drives, optical media, flash memory, tape drives, registers, and random access memory, or the like, or any combination thereof. The server 900 may be a third-party provider of exceptions, bugs, or the like for a product. The server 700 may use input from the database and/or server 900 in dynamically generating an accessibility conformance report.

The storage 710 of the server 700, the database 800, and/or the storage 910 of the server 900 may store data, such as accessibility conformance reports, exceptions, success criteria, audits, logged bugs, pre-release manual testing, automated testing, customer compliance requests, and the like. Further, if the storage 710, storage 910, and/or database 800 is a multitenant system, the storage 710, storage 910, and/or database 800 can be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks, such as communications network 600.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 6 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

The systems and methods of the disclosed subject matter can be for single tenancy and/or multitenancy systems. Multitenancy systems can allow various tenants, which can be, for example, developers, users, groups of users, and/or organizations, to access their own records (e.g., tenant data and the like) on the server system through software tools or instances on the server system that can be shared among the various tenants. The contents of records for each tenant can be part of a database containing that tenant. Contents of records for multiple tenants can all be stored together within the same database, but each tenant can only be able to access contents of records which belong to, or were created by, that tenant. This may allow a database system to enable multitenancy without having to store each tenants' contents of records separately, for example, on separate servers or server systems. The database for a tenant can be, for example, a relational database, hierarchical database, or any other suitable database type. All records stored on the server system can be stored in any suitable structure, including, for example, a log structured merge (LSM) tree.

Further, a multitenant system can have various tenant instances on server systems distributed throughout a network with a computing system at each node. The live or production database instance of each tenant may have its transactions processed at one computer system. The computing system for processing the transactions of that instance may also process transactions of other instances for other tenants.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "generating," "transmitting," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
receiving, at a server, one or more success criteria for content accessibility;
receiving, at the server, a product to be evaluated based on the one or more success criteria, wherein the product is selected from at least one of the group consisting of: a web-based application and a website;
performing, at the server, automated accessibility testing of the product;
determining, at the server, one or more accessibility exceptions of the product based on one or more inputs that include results of the automated accessibility testing, logged bugs determined for the product, and the one or more success criteria;
determining, at the server, relationships between the one or more accessibility exceptions of the product and the one or more success criteria using custom objects and schema from a database communicatively connected to the server;
determining, at the server, product quality of the product using the determined relationships and the one or more accessibility exceptions;
generating, at the server, a dynamic accessibility conformance report based on the product quality; and
transmitting, at the server, the dynamic accessibility conformance report for display.

2. The method of claim 1, wherein the one or more inputs are selected from the group consisting of: audits, logged bugs, pre-release manual testing, and customer compliance requests.

3. The method of claim 1, further comprising:
identifying, at the server, whether the product quality has been determined for each of the one or more success criteria.

4. The method of claim 3, wherein the generating the dynamic accessibility conformance report comprises:
generating, at the server, the dynamic accessibility conformance report that includes the one or more success criteria that the one or more accessibility exceptions have been determined for; and
transmitting, at the server, the dynamic accessibility conformance report for display.

5. The method of claim 1, wherein the dynamic accessibility conformance report includes at least one selected from the group consisting of: the one or more success criteria, one or more work items, a subject of the one or more work items, and a work identifying number.

6. The method of claim 5, wherein the one or more success criteria comprise at least one selected from the group consisting of: non-text content, text content, time-based media, adaptability, distinguishable presentation, keyboard accessibility, navigability, input modalities, readability, predictability of operation, input assistance, and compatibility.

7. The method of claim 6, wherein the one or more work items are product items to be addressed based on the one or more success criteria and the one or more accessibility exceptions.

8. The method of claim 6, wherein the subject of the one or more work items comprises a description of an identified work item based on the one or more success criteria and the one or more accessibility exceptions.

9. The method of claim 1, wherein the dynamic accessibility conformance report provides a status of the product quality at a first predetermined time.

10. The method of claim 9, further comprising:
generating, at the server, an updated dynamic accessibility conformance report based on the product quality and the one or more inputs received by the server at a second predetermined time that is different from the first predetermined time; and
transmitting, at the server, the second dynamic accessibility conformance report for display.

11. A system comprising:
a server comprising a processor coupled to a memory to:
receive one or more success criteria for content accessibility;
receive a product to be evaluated based on the one or more success criteria, wherein the product is selected from at least one of the group consisting of: a web-based application and a website;
perform automated accessibility testing of the product;
determine one or more accessibility exceptions of the product based on one or more inputs that include results of the automated accessibility testing, logged bugs determined for the product, and the one or more success criteria;
determine relationships between the one or more accessibility exceptions of the product and the one or more success criteria using custom objects and schema from a database communicatively connected to the server;
determine product quality of the product using the determined relationships and the one or more accessibility exceptions;
generate a dynamic accessibility conformance report based on the product quality; and
transmit the dynamic accessibility conformance report for display.

12. The system of claim 11, wherein the one or more inputs are selected from the group consisting of: audits, pre-release manual testing, and customer compliance requests.

13. The system of claim 11, wherein the server identifies whether the product quality has been determined for each of the one or more success criteria.

14. The system of claim 13, wherein the server generates the dynamic accessibility conformance report that includes the one or more success criteria that the one or more accessibility exceptions have been determined for and transmits the dynamic accessibility conformance report for display.

15. The system of claim 11, wherein the dynamic accessibility conformance report includes at least one selected from the group consisting of: the one or more success criteria, one or more work items, a subject of the one or more work items, and a work identifying number.

16. The system of claim 15, wherein the one or more success criteria comprise at least one selected from the group consisting of: non-text content, text content, time-based media, adaptability, distinguishable presentation, keyboard accessibility, navigability, input modalities, readability, predictability of operation, input assistance, and compatibility.

17. The system of claim 16, wherein the one or more work items are product items to be addressed based on the one or more success criteria and the one or more accessibility exceptions.

18. The system of claim 16, wherein the subject of the one or more work items comprises a description of an identified work item based on the one or more success criteria and the one or more accessibility exceptions.

19. The system of claim 11, wherein the dynamic accessibility conformance report provides a status of the product quality at a first predetermined time.

20. The system of claim 19, wherein the server generates an updated dynamic accessibility conformance report based on the product quality and the one or more inputs received by the server at a second predetermined time that is different from the first predetermined time, and transmit the second dynamic accessibility conformance report for display.

* * * * *